(12) United States Patent
Miwa et al.

(10) Patent No.: US 7,076,607 B2
(45) Date of Patent: Jul. 11, 2006

(54) SYSTEM, METHOD, AND APPARATUS FOR STORING SEGMENTED DATA AND CORRESPONDING PARITY DATA

(75) Inventors: Yohichi Miwa, Yokohama (JP); Aya Minami, Fujisawa (JP); Tsuyoshi Motoki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 10/350,972

(22) Filed: Jan. 24, 2003

(65) Prior Publication Data

US 2003/0145166 A1    Jul. 31, 2003

(30) Foreign Application Priority Data

Jan. 28, 2002    (JP)    ............... 2002-019194

(51) Int. Cl.
    *G06F 12/00*    (2006.01)
(52) U.S. Cl. ............... 711/114; 711/162; 711/2; 711/209; 714/6; 714/770; 714/758; 714/801; 714/805; 708/531
(58) Field of Classification Search ............... 711/162, 711/2, 209; 714/6, 770, 758, 801, 805; 715/723; 360/8; 708/531
    See application file for complete search history.

(56) References Cited

U.S. PATENT DOCUMENTS 5,253,256 A * 10/1993 Oyama et al. ............... 714/770
5,475,616 A * 12/1995 Dai et al. ............... 715/723
5,596,708 A * 1/1997 Weber ............... 714/6
6,023,780 A * 2/2000 Iwatani ............... 714/770
6,105,116 A * 8/2000 Mori ............... 711/162
6,532,121 B1 * 3/2003 Rust et al. ............... 360/8
6,549,992 B1 * 4/2003 Armangau et al. ............ 711/162

FOREIGN PATENT DOCUMENTS

| JP | 38116 | 7/1991 |
|---|---|---|
| JP | 05-027914 | 2/1993 |
| JP | 10-283123 | 10/1998 |
| JP | 11-203057 | 7/1999 |

* cited by examiner

*Primary Examiner*—Mano Padmanabhan
*Assistant Examiner*—Mardochee Chery
(74) *Attorney, Agent, or Firm*—Kunzler & Associates

(57) ABSTRACT

A system, method, and apparatus are disclosed for storing segmented data and corresponding parity data with modules configured to functionally execute the necessary steps of storing segmented data and corresponding parity data. These modules, in the described embodiments, include a designation module that designates a first set of data, from parity data and a plurality of segmented data, as surplus data and designates the remaining data as primary data. A storage module stores the primary data in main electronic storage devices in a distributed manner and stores a first copy of the surplus data on a first main electronic storage device and a second copy of the surplus data on a second main electronic storage device. An optional auxiliary storage module selectively activates an auxiliary electronic storage device and stores the surplus data on the auxiliary storage device. Beneficially, selective activation of the auxiliary electronic storage conserves power.

23 Claims, 9 Drawing Sheets

SYSTEM, METHOD, AND APPARATUS FOR STORING SEGMENTED DATA AND CORRESPONDING PARITY DATA

BACKGROUND OF THE INVENTION

1. Field of the Invention

The present invention relates to a technique using a plurality of recording devices in parallel. For example, the invention can be applied to a technique for reducing the power consumption of a disk array system that employs a plurality of hard disk drives.

2. Description of Related Art

A RAID (redundant arrays of inexpensive disks) is known as a recording system using a plurality of hard disk drives, and is summarized as a system in which data is divided and resulting segmented data are written to and read from the plurality of hard disk drives in parallel. Currently, there are six kinds of RAIDs, that is, RAID0 to RAID5, among which RAID0, RAID1, and RAID5 are mainly used.

In RAID0, a plurality of hard disk drives are used in parallel and data is recorded in the hard disk drives in a distributed manner. That is, in RAID0, data is divided according to prescribed rules and recorded in the hard disk drives in a distributed manner. In RAID0, the plurality of hard disk drives are unified and operate as if they were a single recording device. Whereas RAID0 has an advantage that data writing and reading can be performed at high speed, it has a disadvantage that recorded data are lost if one hard disk drive fails.

In RAID1, the same data is stored in a plurality of (usually, two) hard disk drives. Whereas RAID1 has an advantage that data are not lost even if one hard disk drive fails, it is equivalent, operation speed, to systems using a single hard disk drive. Further, RAID1 has a disadvantage that the efficiency of utilization of the disk capacities is low and the cost per unit capacity is high, because the total capacity is lower than the sum of the capacities of the hard disk drives used.

RAID5 is composed of three or more hard disk drives. An example of RAID5 that is composed of five hard disk drives, that is, hard disk drive-1 to hard disk drive-5, will be described below. In this case, each block of specific data is segmented into four segmented data. Segmented data of the first block are recorded in hard disk drive-1 to hard disk drive-4 in order. Parity data of the data recorded in hard disk drive-1 to hard disk drive-4 is recorded in hard disk drive-5. Segmented data of the second block are recorded in four hard disk drives that are hard disk drive-5, hard disk drive-1, hard disk drive-2, and hard disk drive-3, and their parity data is recorded in hard disk drive-4. Segmented data of the third block are recorded in four hard disk drives that are hard disk drive-4, hard disk drive-5, hard disk drive-1, and hard disk drive-2, and their parity data is recorded in hard disk drive-3. In this manner, sets of four segmented data and their parity data are recorded in the hard disk drives in a distributed manner.

In this example, as a whole, the capacities of four hard disk drives are used for handling data and the capacity of the remaining one hard disk drive is used for handling parity data. The parity data is auxiliary data to be used for recovering corresponding main data when the main data is lost.

By employing the above method, a RAID5 system using N hard disk drives can record data of an amount corresponding to the total capacity of N−1 hard disk drives in such a manner that the data are distributed to the N hard disk drives. RAID5 enables high-speed data writing and reading because N−1 hard disk drives operate in parallel. Further, in RAID5, even if any hard disk drive fails, the data that were stored in the hard disk drive in failure can be restored by using the data and the parity data that are recorded in the remaining hard disk drives. That is, both the high-speed operation and prevention of data loss due to failure of a hard disk drive can be attained. Data are not restored if two hard disk drives fail simultaneously. However, the probability of an event that two hard disk drives fail simultaneously is very low and hence this is not considered a problem.

In RAID5, since main data and parity data are recorded in the hard disk drives in a distributed manner, loads are not concentrated on a particular hard disk drive and performance reduction that would otherwise be caused can be prevented.

As described above, a RAID5 system using N hard disk drives is equivalent to N−1 hard disk drives that operate in parallel because the capacity of one hard disk drive is used for recording parity data. Therefore, in the RAID5 system using the N hard disk drives, the usable capacity is equal to the total capacity of N−1 hard disk drives and the operation speed is increased to the speed of N−1 hard disk drives that operate in parallel. That is, in RAID5, it is necessary to prepare one extra hard disk drive for the amount of data to be handled. Where the number of hard disk drives constituting a RAID5 system is large, the fact that one extra hard disk drive is needed is not a serious problem. However, where the number of hard disk drives constituting a RAID5 system is small, the above fact is problematic from the viewpoint of effective use of the hard disk drives. For example, in the case of a RAID5 system using the N hard disk drives, 75% of the total capacity bears handling of main data and the remaining 25% serves for recording of parity data; the efficiency of utilization of the hard disk drives used is low. The same is true of RAID3 and RAID4.

The RAID is also associated with a heating problem, which will be described below in detail. Usually, a RAID system is used in a server that requires a large storage capacity. Servers are required to perform data writing and reading as quickly as possible. Therefore, a plurality of hard disk drives constituting a RAID system are in an idling state during operation hours (in some cases, 24 hours). In an idling state, the disks are rotating at constant speeds and hence data writing or reading can be performed immediately.

If idling is not conducted, tens of seconds are necessary to start the hard disk drives and hence data writing or reading can not be performed immediately when necessary. Therefore, server functions cannot be exercised properly.

Idling of a hard disk drive consumes power. In the case of a large-scale server that is equipped with tens of hard disk drives, a considerable power is consumed during idling. For example, in the case of a server in which 20 server units each having four hard disk drives each of which consumes 20 W during idling are mounted on a rack consumes 1,600 W merely for idling. Consumed power is converted into heat, which is dissipated to increase the temperature of the server installation environment.

With the spread of LANs (local area networks) and the Internet, servers have come to be required to have a large storage capacity. Further, with the spread of the Internet, a high percentage of servers are required to operate 24 hours.

In the above circumstances, the above-described idling power that is consumed during all the operation hours and resulting heat generation are problematic. From the viewpoint of energy saving, it is preferable to minimize this power consumption. It is desirable to minimize the generated heat because it causes various problems: it is a load on air-conditioning equipment, may cause a failure or fault in the server itself, and may adversely affect other equipment.

Japanese Patent No. 2546088 discloses a technique for reducing the power consumption of a RAID system. In this technique, N hard disk drives are provided and data is recorded therein in a divisional manner. Parity data is generated for segmented data and divided according to a prescribed procedure. Resulting divisional parity data are recorded in the hard disk drives in such a manner as to be added to the respective segmented data. However, this patent does not suggest that segmented data as well as parity data are subjects of redundant recording or that an auxiliary recording device is used selectively.

BRIEF SUMMARY OF THE INVENTION

An object of the present invention is to provide a data recording system that is increased in the efficiency of utilization of recording devices. Another object of the invention is to provide, in a system using RAID, a technique for reducing the power consumption with least deterioration of RAID functions.

The present invention is outlined as follows. The invention provides a data processing method comprising the steps of obtaining a plurality of segmented data; generating parity data corresponding to the plurality of segmented data; leaving, as surplus data, one or some of the plurality of segmented data and the parity data and recording the other of the plurality of segmented data and the parity data in a plurality of main recording devices in a distributed manner; and recording the surplus data in each of selected ones of the plurality of main recording devices.

According to the above method, RAID functions can be realized by using N hard disk drives, for example, and causing all the N hard disk drives to operate in parallel. Since surplus data is recorded in two or more hard disk drives, an operation of recording the surplus data needs to be performed in data recording. However, in data reading, it is sufficient to read out N segmented data and hence the same performance as obtained by a conventional RAID system using N+1 hard disk drives can be obtained. In ordinary uses, the frequency of data recording is much lower than that of data reading. Therefore, according to the above method, the performance as a recording system is not lower than that of a conventional RAID system using N+1 hard disk drives.

In the above method, data may be divided in units of a prescribed number of bytes or bits; the unit of data division is not limited to a particular one.

In this specification, the term "segmented data" means each of pieces of data that are obtained by dividing data to be recorded, such as text data, according to prescribed rules. The original data is obtained by collecting those pieces of data. The term "parity data" means auxiliary data to be used for restoring, when one of segmented data has been lost, the lost information from the remaining segmented data. Parity data may be obtained by EXCLUSIVE-ORing segmented data or some other appropriate method. Usually, parity data is generated for a prescribed number of segmented data.

The term "surplus data" means a piece of data that remains not correspondent to any main recording device when pieces of data are assigned to the respective main recording devices. The term "main recording device" means a recording device such as a hard disk drive that incorporates a rotary mechanism and that performs a data recording or reading operation or is in an idling state during operation of the system. The term "idling state" means a state (non-operation state) in which data is not being recorded to in or read from a recording device and that the rotary mechanism of the recording device is rotating at a constant speed to enable transition to an operation state any time and hence a certain power is being consumed.

The term "selected ones of the plurality of main recording devices" means two or more main recording devices selected from the plurality of main recording devices. For example, where the main recording devices are four hard disk drives, two hard disk drives selected from the four hard disk drives are "selected ones of the plurality of main recording devices."

It is preferable that the above method further comprise the steps of activating an auxiliary recording device and recording the surplus data in the auxiliary recording device. In the above method, surplus data are recorded in at least two main recording devices. Therefore, if the amount of data to be recorded or recorded data is large, surplus data imposes critical loads on those main recording devices. In view of this, the loads on the main recording devices are reduced by moving, with prescribed timing, the surplus data to the auxiliary recording device that is separate from the main recording devices. Specifically, the auxiliary recording device is activated with proper timing and the surplus data that are recorded in the selected main recording devices are moved to the auxiliary recording device. This increases the free space of the main recording devices and hence prevents reduction in the performance of the main recording devices. In the above method, the system can operate in a power saving operation mode by stopping the auxiliary recording device. That is, selection between system operation modes can be selected arbitrarily in such a manner that the auxiliary recording device is activated and a high-speed recording operation mode is effected when the amount of data to be recorded is large or recording occurs at a high frequency and the power saving operation mode is effected otherwise.

The term "auxiliary recording device" means a recording device such as a hard disk drive that is separate from the main recording devices, incorporates a rotary mechanism, and is activated with arbitrary timing. The term "activation" means an operation of causing transition from a state that in a recording device the rotary mechanism is not in operation and no power is being consumed to an operation state or an idling state. The auxiliary recording device may be of the same device as the main recording devices. The term "power saving (operation) mode" means a mode in which the auxiliary recording device is not activated and hence is not consuming idling power.

In the above method, the steps of obtaining segmented data of a number that is equal to the number of main recording devices; generating parity data corresponding to the segmented data; and recording the segmented data and the parity data in the plurality of main recording devices and the auxiliary recording device in a distributed manner may be executed in a state that the auxiliary recording device as well as the plurality of main recording devices is in operation.

In this case, after being activated, the auxiliary recording device is caused to operate in the same manner as the main recording devices do and segmented data and parity data are recorded in the main recording devices and the auxiliary recording device in a distributed manner according to prescribed rules. This operation can realize functions that are equivalent to the functions of RAID3, RAID4, or RAID5. For example, the use of this operation can realize transition from the power saving operation mode in which the auxiliary recording device is stopped to the ordinary RAID5 operation mode.

The invention can also be implemented as a system or a program. For example, the invention is implemented as a system having means for executing the respective steps described above. Where the invention is implemented as such a system, the system may include an array controller for execution of the invention or a hardware system capable of executing the invention.

DETAILED DESCRIPTION OF THE INVENTION

Preferred embodiments of the present invention will be hereinafter described in detail with reference to the accompanying drawings. However, the invention can be implemented in a lot of other forms and should not be construed as being limited to the following embodiments. In the following embodiments, the same components will be given the same reference symbols.

Figure 1:
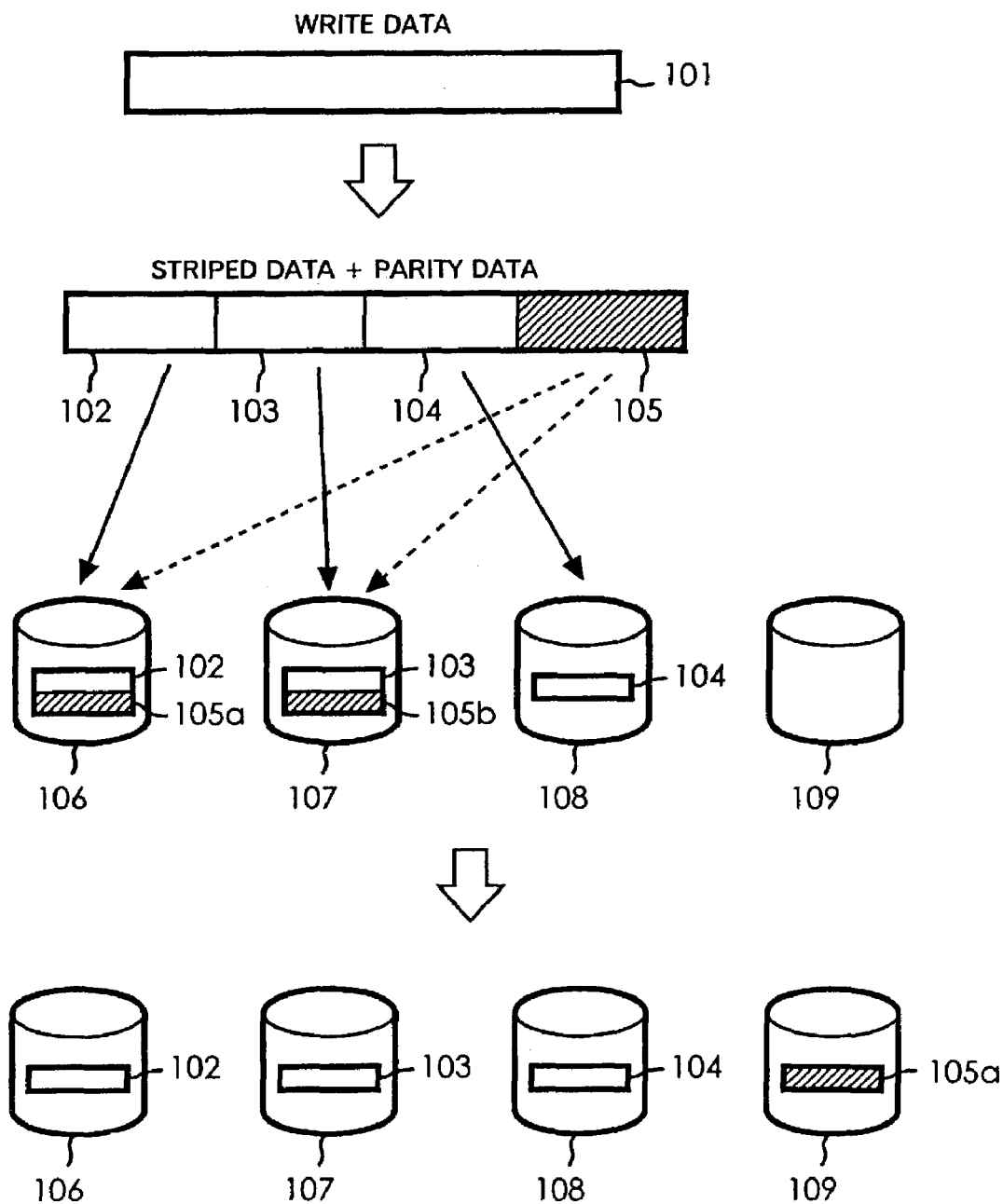
FIG. 1 is a chart illustrating the basic concept of a first embodiment to which a data processing method according to the present invention is applied.

First, the basic concept of a RAID system according to a first embodiment of the invention will be described by using a simplest example. FIG. 1 illustrates the first embodiment to which a data processing method according to the invention is applied. In this example, three hard disk drives are used as main recording devices and one hard disk drive is used as an auxiliary recording device.

In the method of FIG. 1, the four hard disk drives are used in total and, among those, the three hard disk drives always operate as main recording devices and the remaining one hard disk drive operates as an auxiliary recording device only when necessary. In the following description, the use of the ordinary RAID techniques are assumed and segmented data is referred to as "striped data."

First, striped data as segmented data are obtained from write data 101 and parity data is obtained from the striped data. The striped data are pieces of data that are obtained by dividing the write data 101 as data corresponding to respective hard disk drives 106, 107 and 108 as main recording devices. The parity data is auxiliary data for data restoration that is used, when one striped data is lost, to restore the lost striped data using the other striped data.

In the example of FIG. 1, three striped data 102–104 are obtained for the three hard disk drives 106, 107 and 108 that always operate during operation of the system. That is, in the data recording method of the example of FIG. 1, the data 101 is divided into the three striped data 102–104. And parity data 105 of the striped data 102–104 is generated. The parity data 105 is auxiliary data for data restoration that is used, when one of the striped data 102–104 is lost, to restore the lost striped data using the other two striped data.

In the example of FIG. 1, the striped data 102–104 are recorded in the respective hard disk drives 106–108. The parity data 105 as the fourth data (surplus data) in the hard disk drives 106 and 107 as parity data 105a and 105b, respectively. Each of the parity data 105a and 105b is the same as the parity data 105.

In this example, the two hard disk drives 106 and 107 are selected from the hard disk drives 106–108 (main recording devices) as recording devices in which to record the surplus data.

In this state, the three hard disk drives 106–108 operate in parallel. That is, writing and reading of the data 101 are performed in a manner that the hard disk drives 106–108 operate in parallel. In this operation form, all the three hard disk drives 106–108 can be utilized effectively. That is, the hard disk drives 106–108 can perform data writing and reading can be performed while exercising the abilities of three hard disk drives. However, since the parity data 105 are recorded redundantly in the two hard disk drives 106 and 107 as the parity data 105a and 105b, the effective data storage capacity decreases accordingly.

Even if one of the hard disk drives 106–108 fails in this state and the data recorded therein is lost, the data is maintained in the system. For example, if the hard disk drive 106 fails and the striped data 102 recorded therein can no longer be read, the striped data 102 can be restored by using the striped data 103 and the parity data 105b that are recorded in the hard disk drive 107 and the striped data 104 that is recorded in the hard disk drive 108.

If the hard disk drive 107 fails and the striped data 103 recorded therein can no longer be read, the striped data 103 can be restored by using the striped data 102 and the parity data 105a that are recorded in the hard disk drive 106 and the striped data 104 that is recorded in the hard disk drive 108.

If the hard disk drive 108 fails and the striped data 104 recorded therein can no longer be read, the striped data 104 can be restored by using the striped data 102 and the parity data 105a that are recorded in the hard disk drive 106 and the striped data 103 that is recorded in the hard disk drive 107.

In this manner, even if one of the three hard disk drives 106–108 fails, an event that the system loses data can be avoided.

Further, in the exemplary system of FIG. 1, an auxiliary hard disk drive 109 as an auxiliary recording device is activated when necessary and the copy data 105a or 105b as surplus data that is recorded in the hard disk drive 106 or 107 as a main recording device is moved to the auxiliary hard disk drive 109. At this time, the parity data 105a and 105b are erased from the hard disk drives 106 and 107, whereby the original effective storage capacities of the hard disk drives 106 and 107 are restored. The auxiliary hard disk drive 109 is stopped upon completion of the recording of the surplus data.

In the example of FIG. 1, the parity data 105 is selected as surplus data that is recorded in the two hard disk drives 106 and 107 and moved to the auxiliary hard disk drive 109 with proper timing. However, an arbitrary one of the striped data 102 and 104 can be selected as surplus data. And hard disk drives to be used for recording surplus data are not limited to particular ones and can be selected arbitrarily.

The auxiliary hard disk drive 109 may be activated with various kinds of timing. For example, the auxiliary hard disk drive 109 may be activated every constant interval and caused to operate for a short time, may be activated when the amount of surplus data recorded in one of the hard disk drives 106–108 has exceeded a prescribed value, may be activated if the amount of data to be handled is larger than a prescribed value, may be activated in response to a user's manipulation, or may be activated automatically if the frequency of data write accesses becomes higher than a prescribed value.

Whereas the activation of the auxiliary hard disk drive 109 adds a power consumption of one hard disk drive, it means transition to a high-speed operation (ordinary RAID operation) mode. In this manner, selection can be made between the power saving mode in which the operation speed is somewhat low and the high-speed operation mode in which high-speed operation is possible though the power consumption increases.

Figure 2:
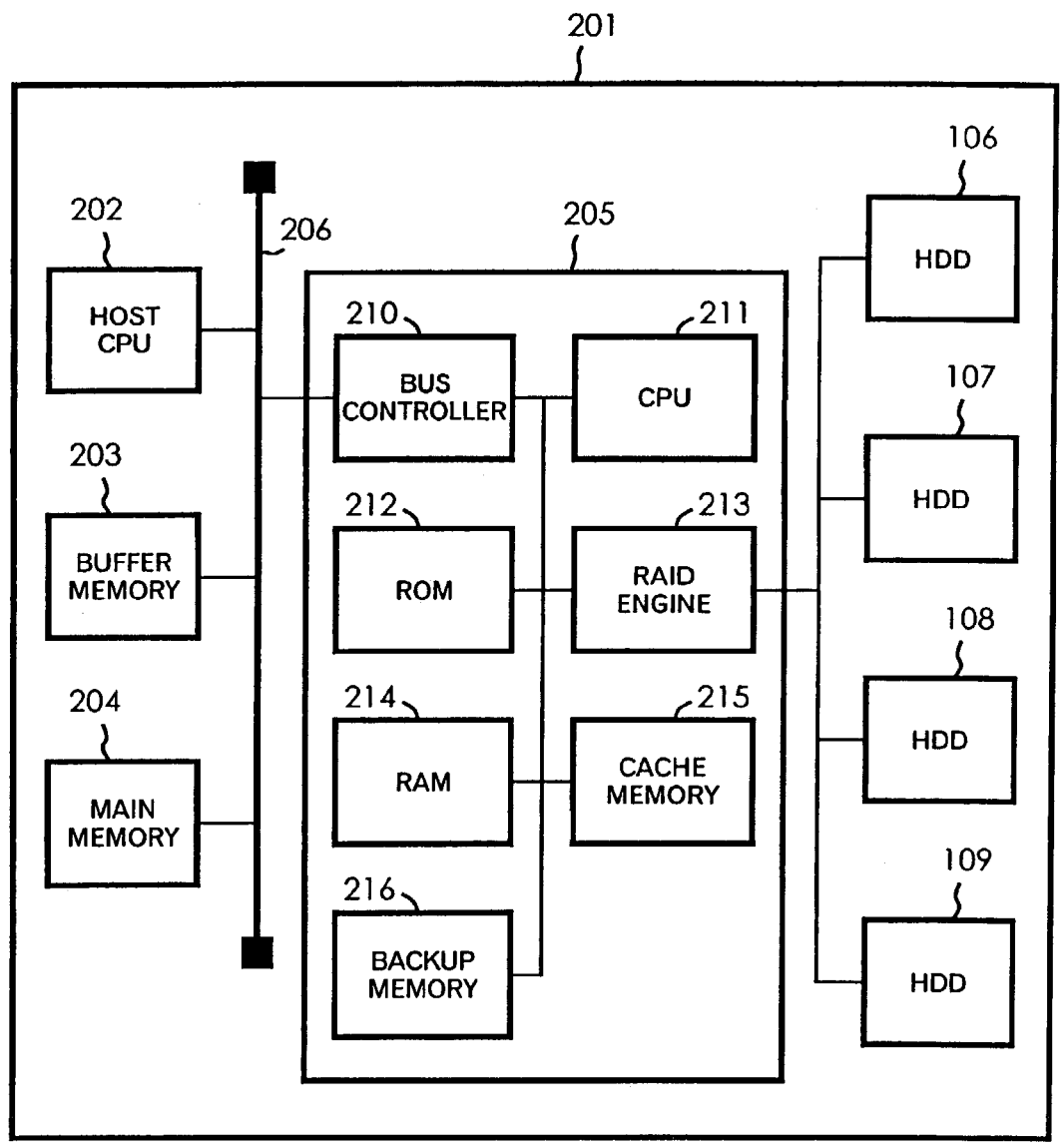
FIG. 2 is a block diagram outlining a RAID system according to the first embodiment.

A more specific example will be described below. FIG. 2 outlines a RAID system according to the first embodiment to which the data processing method according to the invention is applied. A server 201 having RAID functions includes a host CPU (central processing unit) 202, a buffer memory 203, a main memory 204, an array controller 205, a bus line 206, and hard disk drives 106–109.

The array controller 205, which is hardware dedicated to execution of the RAID functions, includes a bus controller 210, a CPU 211, a ROM (read-only memory) 212, a RAID engine 213, a RAM (random access memory) 214, a cache memory 215, and a backup memory 216.

The host CPU 202 unifies the functions of the server 201. The buffer memory 203 has a function of temporarily storing data in recording, in the hard disk drives 106–109 using the RAID functions, data that are recorded in the main memory 204.

The bus controller 210 has a function of controlling data exchange between the array controller 205 and the bus line 206. The CPU 211 unifies and controls the devices of the array controller 205 and performs processing for realizing RAID. Specifically, the CPU 211 generates striped data to be recorded in the hard disk drives 106–109, generates parity data, transfers those data, and performs other processing.

Programs for performing the functions of the array controller 205 and necessary data are recorded in the ROM 212. The RAID engine 213 has a function of controlling the operation states of the hard disk drives 106–109. Further, data exchange between the array controller 205 and the hard disk drives 106–109 is performed through the RAID engine 213. The RAM 214 has a function of temporarily storing information that is necessary during operation of the array controller 205. The cache memory 215 has a function of temporarily storing data in recording data in or reading data from the hard disk drives 106–109. A management table for data that are recorded in a plurality of hard disk drives in a distributed manner and a management table for surplus data are recorded in the backup memory 216. Backed up by a battery (not shown), the backup memory 216 prevents loss of recorded data at the time of unexpected power shutoff.

In the server 201 of FIG. 2, the hard disk drives 106–108 function as main recording devices that always operate during operation of the system and the hard disk drive 109 functions as an auxiliary recording device that is activated when necessary.

Figure 3:
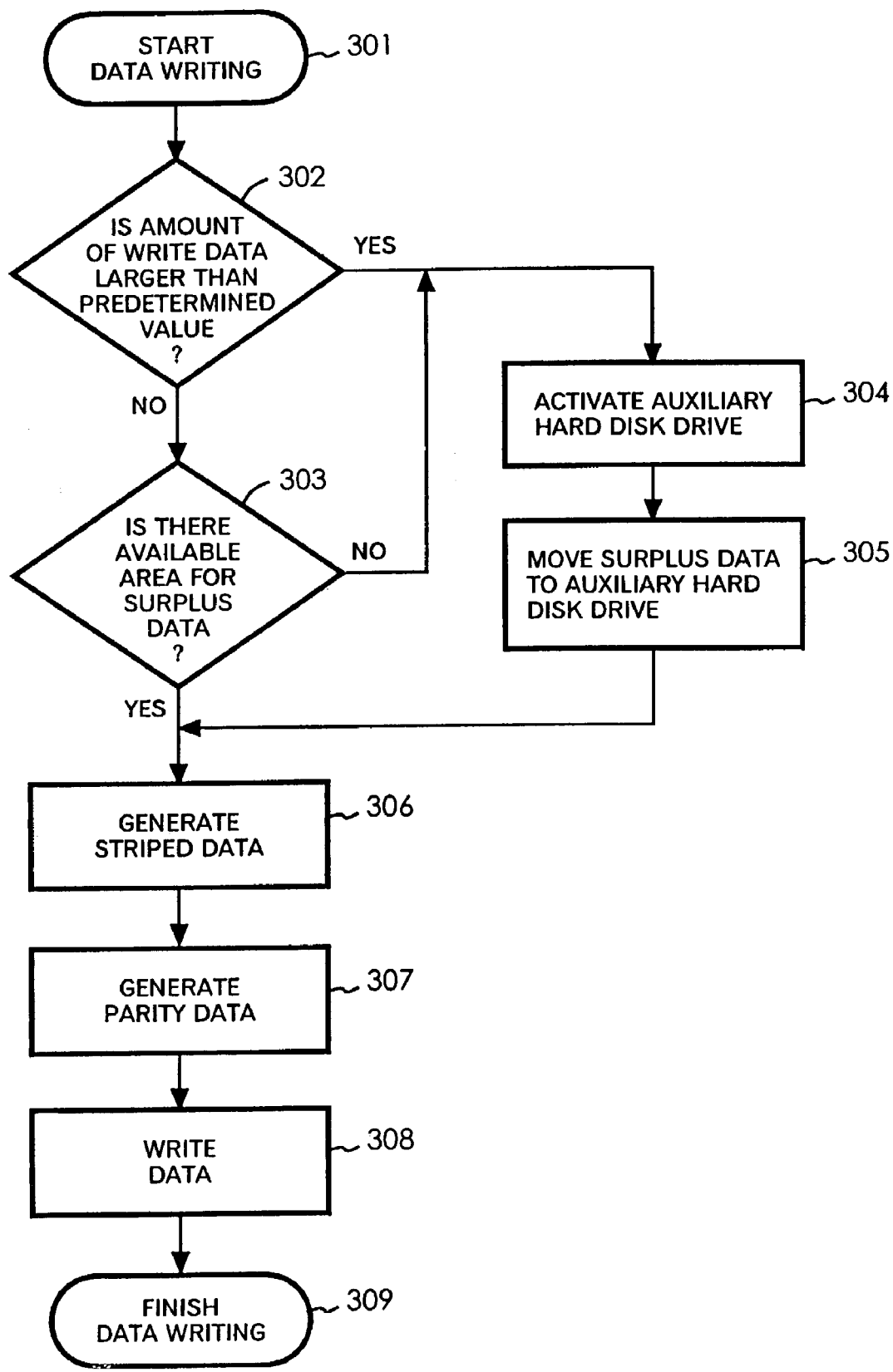
FIG. 3 is a flowchart showing the operation of the RAID system of FIG. 2.
Figure 4:
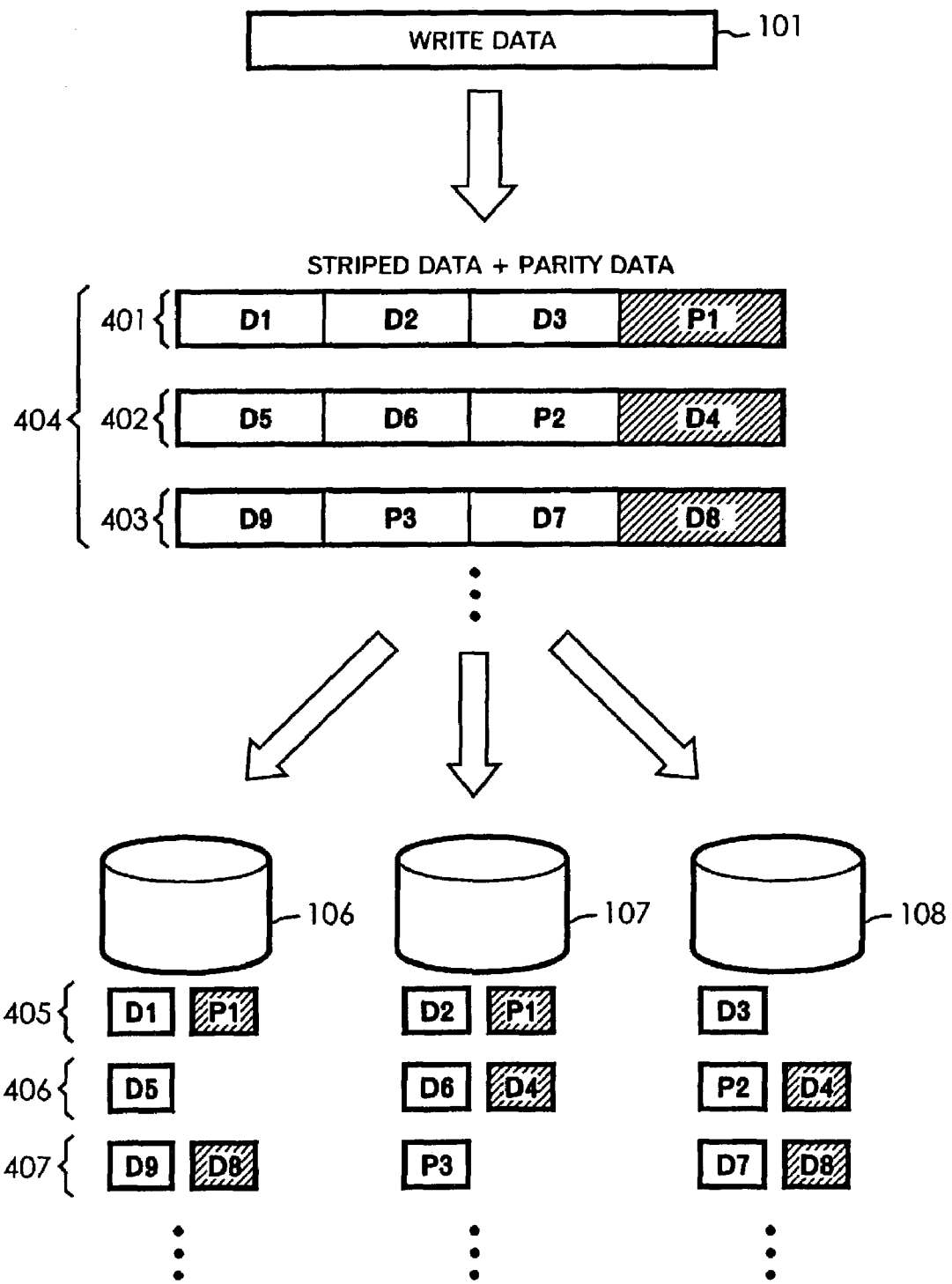
FIG. 4 is a chart exemplifying the operation of the RAID system of FIG. 2.

FIG. 3 is a flowchart showing the operation of the RAID system of FIG. 2. FIG. 4 is a chart exemplifying the operation of the RAID system of FIG. 2.

A description will be made of an example in which data is recorded by using the RAID functions in the server 201 shown in FIG. 2 that has the RAID functions. The following example is such that a user gives necessary instructions to the server 201 by manipulating a computer terminal (not shown) that is connected to the server 201 via a LAN (local area network; not shown) or the like. An exemplary operation in the power saving mode in which the auxiliary hard disk drive 109 is not used will be described first, and another exemplary operation in the high-speed operation mode in which the auxiliary hard disk drive 109 is used will be described next.

First, the user selects data to be recorded in the hard disk drives 106–109 of the server 201 from the data in a terminal (not shown) that is used by the user or the main memory 204, and performs a manipulation for instructing the server 201 to record the selected data. Data writing is thus started (step 301). In the initial state, the hard disk drives 106–109 are idling and the auxiliary hard disk drive 109 is stopped.

The data selected by the user is temporarily stored in the buffer memory 203 and then sent to the array controller 205. This operation is controlled by the host CPU 202. In the array controller 205, the data that is sent from the buffer memory 203 is received by the bus controller 210 and temporarily stored in the cache memory 215. The CPU 211 judges whether the amount of the data received by the array controller 205 is larger than a prescribed value (step 302). If the judgment result at step 302 is false, the CPU 211 judges whether each of the hard disk drives 106–109 have an available area for recording of surplus data (i.e., free space for writing of surplus data) (step 303). If the judgment result at step 303 is true, striping processing is performed on the data in the cache memory 215, whereby striped data are obtained (step 306). Parity data is generated from the striped data (step 307). These operations are performed by the CPU 211 according to the programs that are recorded in the ROM 212.

FIG. 4 shows examples of write data 101 and corresponding striped data and parity data. In the example of FIG. 4, a data group 401 consisting of striped data D1–D3 and their parity data P1, a data group 402 consisting of striped data D4–D6 and their parity data P2, and a data group 403 consisting of striped data D7–D9 and their parity data P3 are generated from the write data 101. This example is directed to the case that the striped data D1–D9 are generated on a block-by-block basis.

For example, the parity data P1 is obtained by EXCLUSIVE-ORing the striped data D1–D3 on a byte-by-byte basis. The parity data P1 is auxiliary data to be used for restoring, when one of the striped data D1–D3 is lost, the lost data using the remaining two striped data.

The surplus data of the data groups 401–403 are the parity data P1, the striped data D4, and the striped data D8, respectively. The generation of the striped data D1–D9 and the parity data P1–P3 is performed by the CPU 211.

Subsequently, the generated striped data D1–D9 and parity data P1–P3 are recorded in the hard disk drives 106–109 (step 308).

At step 308, the data group 401 is recorded in the hard disk drives 106–108 in such a manner as to be divided as indicated by reference numeral 405. More specifically, in the case of the data group 401, the striped data D1 and the parity data P1 as the surplus data are recorded in the hard disk drive 106, the striped data D2 and the parity data P1 as the surplus data are recorded in the hard disk drive 107, and the striped data D3 is recorded in the hard disk drive 108. That is, the parity data P1 as the surplus data is recorded in each of the hard disk drives 106 and 107 but is not recorded in the hard disk drive 108.

Similarly, the data group 402 is recorded in the hard disk drives 106–108 in such a manner as to be divided as indicated by reference numeral 406. The data group 403 is recorded in the hard disk drives 106–108 in such a manner as to be divided as indicated by reference numeral 407. The above recording operations on the hard disk drives 106–108 are performed by the RAID engine 213 under the control of the CPU 211.

Information on the recording destinations of the striped data D1–D9 and the parity data P1–P3 is recorded in the management table in the backup memory 216.

Employing the above methods of data processing and writing to the hard disk drives 106–108 makes it possible to distribute striped data and parity data equally to the hard disk drives 106–108 and impose the loads equally on the respective hard disk drives 106–108. This prevents the phenomenon that loads are concentrated on a particular hard disk drive in data writing or reading.

Although in this example the write data 101 is converted into the data groups 404, what striped data and parity data are obtained depends on the amount of the write data 101 and the unit of striping.

The write data 101 is divided and recorded in the hard disk drives 106–108 in the above manner and the data writing is finished (step 309).

Next, a description will be made of an example in which data that were recorded in the power saving mode are read out. It is assumed that data are recorded in (distributed to) the hard disk drives 106–108 in the manner shown in FIG. 4.

First, in the array controller 205, in response to an access request from the host CPU 202, management information relating to the data concerned is read from the backup memory 216. By referring to the management information, the array controller 205 issues data read instructions to the hard disk drives 106–108. At this time, no instructions to read out the surplus data are issued.

Receiving the above instructions, the hard disk drives 106–108 operate in parallel and thereby read out the pieces of data concerned and send those to the array controller 205. More specifically, the hard disk drive 106 reads out the data D1, D5, and D9 and sends those to the array controller 205. The hard disk drive 107 reads out the data D2, D6, and P3 and sends those to the array controller 205. The hard disk drive 108 reads out the data D3, P2, and D7 and sends those to the array controller 205.

In the array controller 205, the striped data D4 that is not sent from the hard disk drives 106–108 is generated by using the striped data D5 and D6 and the parity data P2 and the striped data D8 is generated by using the striped data D7 and D9 and the parity data P3. The striped data D1–D9 are obtained in this manner and the data 101 is obtained from the striped data D1–D9. In this manner, the data 101 is read out that is recorded in the hard disk drives 106–108 in a distributed manner.

In the above-described data writing and reading operations, the writing speed is somewhat lower than in the ordinary RAIDs (e.g., RAID5) because surplus data are written in the writing operation. However, in the data reading operation, the reading speed is the same as in the ordinary RAIDs because it is not necessary to read out the surplus data that are recorded in the hard disk drives 106–108. In ordinary methods of use of RAID systems, the frequency of data writing is much lower than that of data reading. Therefore, in terms of the RAID total performance, the above-described mode of operation is considered equivalent to a conventional RAID system that requires one additional hard disk drive. That is, a system can be obtained that is equivalent, in RAID total performance, to a conventional RAID system though the number of hard disk drives is smaller than the latter by one.

Next, a description will be made of an example in which the auxiliary hard disk drive 109 operates. The example is such that the auxiliary hard disk drive 109 operates in addition to the main hard disk drives 106–108 because the amount of data to be written (corresponding to the data 101) is large. In this case, the amount of surplus data to be recorded in the hard disk drives 106–108 in a distributed manner should also be large because of the large amount of the data to be written and loads on the respective hard disk drives 106–108 should be heavy. This causes a problem that the data writing speed is lowered. To avoid this problem, in the method shown in the flowchart of FIG. 3, it is judged at step 302 whether the amount of write data is larger than the prescribed value.

If the judgment result at step 302 is true, the auxiliary hard disk drive 109 is activated which has been stopped so far (step S304). The surplus data that are recorded in the hard disk drives 106–108 are moved to the auxiliary hard disk drive 109 (step 305).

The movement of the surplus data to the auxiliary hard disk drive 109, which is performed at step 305, will be described below in more detail.

Figure 5:
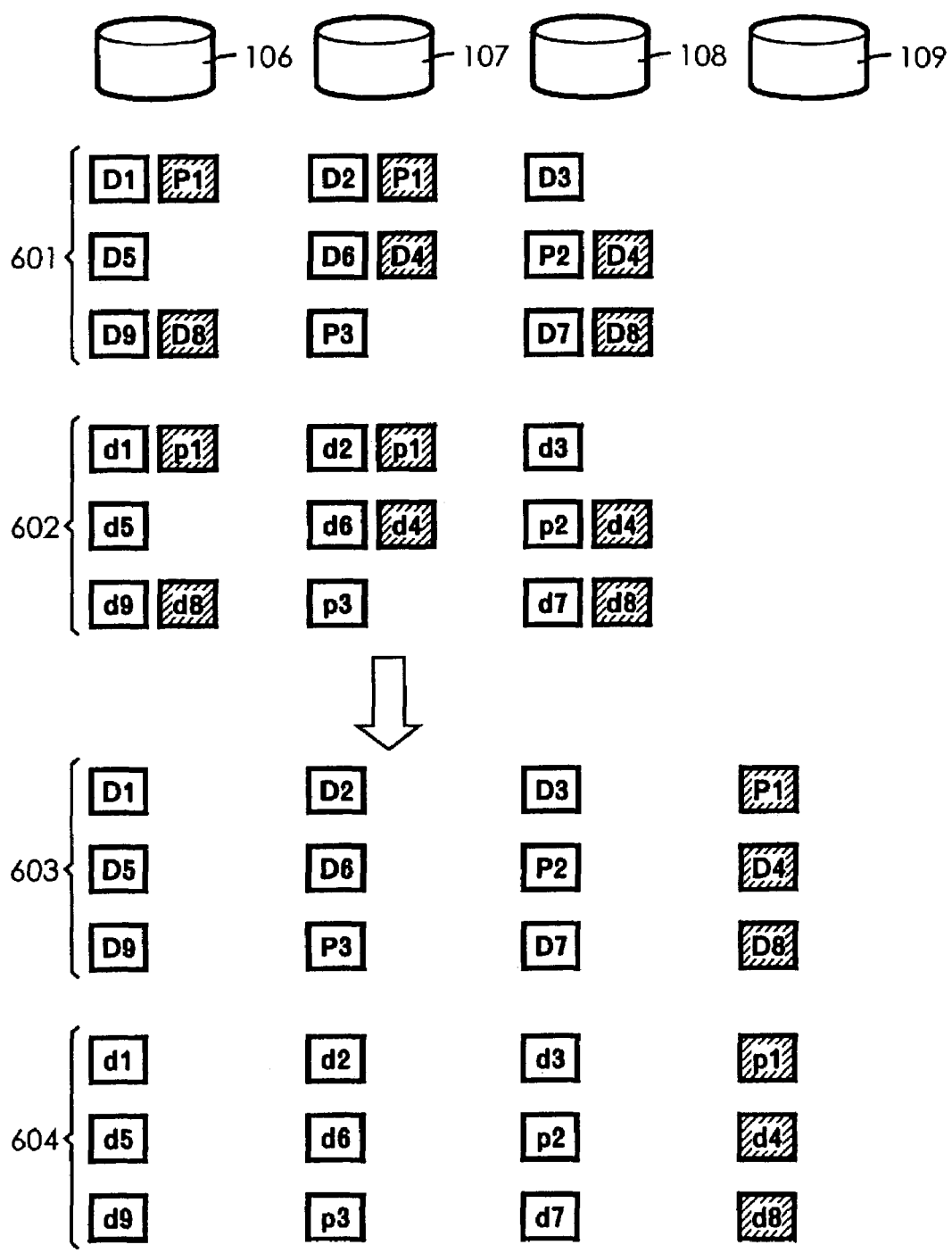
FIG. 5 is a chart illustrating an example of movement of surplus data to an auxiliary hard disk drive according to the first embodiment.

FIG. 5 is a chart illustrating an example of movement of surplus data to the auxiliary hard disk drive 109 according to the first embodiment of the invention. More specifically, FIG. 5 illustrates an example of step 305 in which, in a state that two data groups 601 and 602 are recorded in the hard disk drives 106–108, the auxiliary hard disk drive 109 is activated and surplus data that are recorded in the hard disk drives 106–108 are moved to the auxiliary hard disk drive 109. The data groups 601 and 602 are different data that were written in the manner shown in FIG. 4.

First, in the array controller 205, management information of the surplus data that is recorded in the management table of the backup memory 216 is referred to. As a result, information to the effect that surplus data P1, D8, p1 and d8 are recorded in the hard disk drive 106 is obtained. Similarly, information to the effect that surplus data P1, D4, p1, and d4 are recorded in the hard disk drive 107 and information to the effect that surplus data D4, D8, d4, and d8 are recorded in the hard disk drive 108 are obtained. On the basis of the above management information of the surplus data, the array controller 205 issues surplus data read instructions to the hard disk drives 106–108. According to those instructions, the hard disk drives 106–108 read out the surplus data. Since the surplus data P1 is recorded redundantly in both of the hard disk drives 106 and 107, it is read from one of the hard disk drives 106 and 107. The same is true of the other surplus data.

The read-out surplus data are sent from the hard disk drives 106–108 to the array controller 205. The surplus data are then sent from the array controller 205 to the auxiliary hard disk drive 109 and recorded therein. The surplus data that were recorded in the hard disk drives 106–108 are then erased. The management information of the surplus data that have been moved to the auxiliary hard disk drive 109 is deleted from the management table.

As a result, the surplus data P1, D4, D8, p1, d4, and d8 are moved to the auxiliary hard disk drive 109 and a state indicated by reference numerals 603 and 604 is obtained.

The above-described operation of moving the surplus data to the auxiliary hard disk drive 109 is also performed if the judgment result at step 303 is false. That is, if the capacity of an area of any of the hard disk drives 106–108 that is available for recording of the surplus data is smaller than or equal to the prescribed value, the auxiliary hard disk drive 109 is activated and the surplus data that are recorded in the hard disk drives 106–108 are moved to the auxiliary hard disk drive 109. In this manner, new areas to which surplus data can be written are secured in the hard disk drives 106–108.

After the surplus data have been moved to the auxiliary hard disk drive 109, the auxiliary hard disk drive 109 is stopped and transition is made to the power saving mode in which only the hard disk drives 106–108 are used. Since the surplus data that were recorded in the hard disk drives 106–108 have been moved to the auxiliary hard disk drive 109, the hard disk drives 106–108 are free of the loads of recorded surplus data and data can be recorded therein in the power saving mode.

Data recording in the high-speed operation mode in which the auxiliary hard disk drive 109 is in operation is also possible. In this case, the RAID system uses the auxiliary hard disk drive 109 in addition to the hard disk drives 106–108. In the operation mode using the auxiliary hard disk drive 109, the writing speed is expected to be higher than the power saving mode in which the auxiliary hard disk drive 109 is stopped completely. The operation mode using the auxiliary hard disk drive 109 provides the same performance as the ordinary RAIDs do and hence can also be called an ordinary operation mode.

A description will be made of an exemplary data recording method in a state that the auxiliary hard disk drive 109 is in operation (the ordinary operation mode or high-speed operation mode).

In this example, in the array controller 205, striped data D1–D3 and their parity data P1, striped data D4–D6 and their parity data P2, and striped data D7–D9 and their parity data P3 are generated as indicated by reference numeral 603 in FIG. 5. The striped data D1, D5, and D9 are recorded in the hard disk drive 106, the striped data D2 and D6 and the parity data P3 are recorded in the hard disk drive 107, the striped data D3 and D7 and the parity data P2 are recorded in the hard disk drive 108, and the striped data D4 and D8 and the parity data P1 are recorded in the auxiliary hard disk drive 109. Management information of the pieces of data recorded in the hard disk drives 106–109 is recorded in the management table of the backup memory 216. Alternatively, the pieces of data may be managed in the same manner as in the ordinary RAID5, in which case management information need not be written to the backup memory 216.

In the above-described data recording operation in the high-speed operation mode in which the auxiliary hard disk drive 109 is in operation, there are no surplus data and striped data and parity data are recorded in the hard disk drives 106–109 in a distributed manner. The data handling method of this recording form is the same as in RAID5, and hence the performance of this recording form is equivalent to that of RAID5.

Other manners of selection between the power saving mode in which the auxiliary hard disk drive 109 is not used and the high-speed operation mode in which the auxiliary hard disk drive 109 is in operation will be described below. In a first manner of selection, data write accesses are monitored and transition is made from the power saving mode to the high-speed operation mode if the number of write operations in a prescribed time becomes larger than a predetermined number. In the data recording in the power saving mode, surplus data needs to be recorded redundantly in two hard disk drives. Therefore, the writing speed in the data recording is lower than in the high-speed operation mode. In view of this, the above-described setting is made that transition to the high-speed operation is made automatically if the frequency of write operations is high, whereby reduction in writing speed is prevented when the frequency of data write operations is high.

Another manner of selection between the power saving mode in which the auxiliary hard disk drive 109 is not used and the high-speed operation mode in which the auxiliary hard disk drive 109 is in operation is such that the user selects a mode manually. For example, the user manually switches from the power saving mode to the high-speed operation mode when he intends to back up a large amount of data. This may be done by preparing, in the terminal that is used by the user, a GUI (graphical user interface) in which a click button that allows arbitrary selection between the power saving mode and the high-speed operation mode is displayed on the screen.

Still another manner of operation mode switching is such that switching from the power saving mode to the high-speed operation mode is made at a predetermined time. For example, this manner is employed in a case that a time slot can be predicted in which data backup operations would concentrate, such as a time after working hours or the night before a weekend, and in a case that a time in which write requests would concentrate can be predicted statistically. In these cases, setting is made so that the auxiliary hard disk drive 109 starts operating in a predetermined time slot, during which data writing is performed in the high-speed operation mode in which the auxiliary hard disk drive 109 is also used.

A description will be made of a specific example in which transition is made automatically from the power saving mode to the high-speed operation mode and data writing is performed in the high-speed operation mode if the number of write operations in a prescribed period becomes larger than a prescribed number. In this example, a program for realizing a function of monitoring data write requests and causing transition from the power saving mode in which only the hard disk drives 106–108 are in operation to the high-speed operation mode in which the auxiliary hard disk drive 109 is also in operation is stored in the ROM 212 of the array controller 205.

Transition from the power saving mode in which only the hard disk drives 106–108 are in operation to the high-speed operation mode in which the auxiliary hard disk drive 109 is also in operation is made at a time point when due to concentration of accesses from terminals (not shown) the number of write accesses in the prescribed period has become larger than the prescribed number.

A certain time is needed from the start of transition to the high-speed operation mode to its end because activation of the auxiliary hard disk drive 109 takes a while. In view of this, data for which a write access is made before completion of transition to the high-speed operation mode is recorded in the power saving mode. And data that cannot be recorded immediately is stored temporarily in the cache memory 215. After completion of activation of the auxiliary hard disk drive 109, data that are stored in the cache memory 215 and data for which write requests were made are recorded in the hard disk drives 106–109 in a distributed manner in the recording form of the high-speed operation mode.

In the data recording operation in the power saving mode, management information of surplus data is recorded in the management table of the backup memory 216. After transition to the high-speed operation mode, management information of surplus data is not recorded and data are managed in the same manner as in the ordinary RAIDs.

Surplus data that are recorded in the hard disk drives 106–108 may be moved to the auxiliary hard disk drive 109 after completion of recording of data for which recording requests were made.

If the frequency of data write requests has decreased and the load has decreased to such an extent that the auxiliary hard disk drive 109 need not operate, the auxiliary hard disk drive 109 is stopped and transition is made from the high-speed operation mode to the power saving mode.

There are several methods of transition from the high-speed operation mode to the power saving mode. One method is such that the auxiliary hard disk drive 109 is stopped upon detection of a state that the frequency of data write operations has become lower than or equal to a prescribed value. Another method is such that the auxiliary hard disk drive 109 is stopped manually by the user. In a further method, a program for stopping the auxiliary hard disk drive 109 at a predetermined time point is used.

Next, a description will be made of how data recorded in the system are read out after movement of surplus data to the auxiliary hard disk drive 109. Two methods are available. In the first method, the auxiliary hard disk drive 109 that is in operation is stopped again (rendered in a non-idling state) and the data are read out in the power saving mode. In the second method, the auxiliary hard disk drive 109 is kept operating and the data are read out in the high-speed operation mode.

First, the method in which data are read out in the power saving mode will be described. In this case, data are recorded in the hard disk drives 106–109 in a manner as indicated by reference numeral 601 in FIG. 5 or in a manner as indicated by reference numeral 603.

First, a method for reading out the data that are recorded in the manner indicated by reference numeral 601 in FIG. 5 will be described. That is, a method for reading the data that are recorded in the hard disk drives 106–108 in the power saving mode in which the auxiliary hard disk drive 109 is not used will be described. In this case, first, an instruction to read out the data concerned is issued to the array controller 205. In the array controller 205, the management information of the data concerned that is recorded in the management table of the backup memory 216 is referred to. Then, the array controller 205 issues, to the hard disk drives 106–108, instructions to read out pieces of data concerned. At this time, no instructions to read out the surplus data are issued.

In response to the read instructions, the pieces of data D1, D5, and D9 are read from the hard disk drive 106, the pieces of data D2, D6, and P3 are read from the hard disk drive 107, and the pieces of data D3, P2, and D7 are read from the hard disk drive 108. The pieces of data that have been read from the hard disk drives 106–108 are sent to the array controller 205. In the array controller 205, the striped data D4 is generated from the striped data D5 and D6 and the parity data P2 and the striped data D8 is generated from the striped data D7 and D9 and the parity data P3. In this manner, the array controller 205 obtains the striped data D1–D9. The striped data D1–D9 are combined together in the array controller 205, whereby the original data 101 (see FIG. 4) is obtained. In this manner, the data 101 that is recorded in the hard disk drives 106–108 in a distributed manner is read out.

Next, a description will be made of a method for reading out the data that are recorded in the manner indicated by reference numeral 603 in FIG. 5 in the power saving mode in which the auxiliary hard disk drive 109 does not operate. In this case, since the auxiliary hard disk drive 109 is not in operation, the data P1, D4, and D8 cannot be read from the auxiliary hard disk drive 109.

First, in the array controller 205 that has received an instruction to read out the data concerned, the management information of the data concerned that is recorded in the management table of the backup memory 216 is referred to. Then, the array controller 205 issues, to the hard disk drives 106–108, instructions to read out the pieces of data concerned. In response, the pieces of data D1, D5, and D9 are read from the hard disk drive 106, the pieces of data D2, D6, and P3 are read from the hard disk drive 107, and the pieces of data D3, P2, and D7 are read from the hard disk drive 108. The read-out pieces of data are sent from the hard disk drives 106–108 to the array controller 205. In the array controller 205, the striped data D4 is generated from the striped data D5 and D6 and the parity data P2 and the striped data D8 is generated from the striped data D7 and D9 and the parity data P3. In this manner, the striped data D1–D9 are obtained. The recorded data 101 (see FIG. 4) is obtained from the striped data D1–D9.

The data reading in the power saving mode in which the auxiliary hard disk drive 109 does not operate is performed in the above-described manner.

Next, the method for reading out data in the high-speed operation mode in which the auxiliary hard disk drive 109 operates in addition to the hard disk drives 106–108 will be described. A case of reading out, in the high-speed operation mode, data that is recorded in a manner as indicated by reference numeral 603 in FIG. 5 will be described.

First, an instruction to read out the data concerned is issued to the array controller 205. In the array controller 205, the management information of the data concerned that is recorded in the management table of the backup memory 216 is referred to. Then, the array controller 205 issues, to the hard disk drives 106–109, instructions to read out pieces of data concerned. At this time, the instructions to read out pieces of data are issued only for the striped data.

In response to the read instructions, the striped data D1, D5, and D9 are read from the hard disk drive 106, the striped data D2 and D6 are read from the hard disk drive 107, the striped data D3 and D7 are read from the hard disk drive 108, and the striped data D4 and D8 are read from the hard disk drive 109. The pieces of data that have been read from the hard disk drives 106–109 are sent to the array controller 205. In the array controller 205, the original data 101 is obtained from the striped data D1–D9 sent from the hard disk drives 106–109. In this manner, the data 101 is read out in the high-speed operation mode in which the auxiliary hard disk drive 109 is used.

There may occur a case that in data reading in the high-speed operation mode in which the auxiliary hard disk drive 109 is used, data as a subject of reading is recorded in a manner indicated by reference numeral 601 in FIG. 5 in which the auxiliary hard disk drive 109 is not used. In this case, the pieces of data concerned excluding the surplus data are read from the hard disk drives 106–108 and the data 101 that is recorded in the system is read out in the same manner as in the case of the data reading in the power saving mode.

Next, a description will be made of how to restore data that have been lost due to a failure of one hard disk drive during operation in the power saving mode. Cases that data are recorded in manners indicated by reference numerals 601 and 603 in FIG. 5, respectively, in the system of FIG. 2 will be described.

First, the case that data is recorded in the manner indicated by reference numeral 601 in FIG. 5 will be described. It is assumed that the system is operating in the power saving mode in which the hard disk drive 109 is not in operation.

Data is recorded in the hard disk drives 106–108 in a distributed manner in the manner indicated by reference numeral 601. A case that the hard disk drive 106 has failed in this state will be described. First, the hard disk drive 106 fails for a certain reason to disable reading of the data recorded therein. The reason for the failure of the hard disk drive 106 may be a failure of its rotary mechanism or its mechanism for controlling the head movement.

When the hard disk drive 106 has failed, the pieces of data D1, P1, D5, D9, and D8 that are recorded therein can no longer be read out. If a data read request arrives, in the array controller 205, the management table of the backup memory 216 is referred to and instructions to read out pieces of data of the data concerned are issued to the hard disk drives 106–108. Being in failure, the hard disk drive 106 does not respond to the data read instruction. In the array controller 205, it is judged that the hard disk drive 106 is in failure.

Judging that the hard disk drive 106 is in failure, the array controller 205 refers to the management table of the backup memory 216 and issues, to the hard disk drive 107, an instruction to read out not only the pieces of data D2, D6, and P3 but also the surplus data P1 and D4. Similarly, the array controller 205 refers to the management table of the backup memory 216 and issues, to the hard disk drive 108, an instruction to read out not only the pieces of data D3, P2, and D7 but also the surplus data D4 and D8.

The pieces of data that have been read from the hard disk drives 107 and 108 are sent to the array controller 205. In the array controller 205, the data that are recorded in the hard disk drive 106 are restored based on the pieces of data that have been read from the hard disk drives 107 and 108. More specifically, in the array controller 205, the striped data D1 is generated from the striped data D2 and D3 and the parity data P1, the striped data D5 is generated from the striped data D4 and D6 and the parity data P2, and the striped data D9 is generated from the striped data D7 and D8 and the parity data P3.

In this manner, the pieces of data D1, D5, and D9 that are recorded in the hard disk drive 106 are restored. The parity data P1 and the striped data D8 that are recorded in the hard disk drive 106 need not be restored because they are also recorded in the other hard disk drives 107 and 108, respectively.

The striped data D1–D9 are obtained in the above-described manner and the original data is obtained from the striped data D1–D9. As described above, even if the hard disk drive 106 fails, the lost data can be restored based on the data that are recorded in the remaining hard disk drives 107 and 108, and an event that the system loses data can be avoided.

Since the above operation is performed automatically, the user who instructed the system to read out the data feels as if the system were operating in the same manner as an ordinary system operates.

Next, a description will be made of an operation that is performed when one hard disk drive fails during operation in the high-speed operation mode in which the auxiliary hard disk drive 109 operates in addition to the main hard disk drives 106–108. A case of reading out data that is recorded in a manner indicated by reference numeral 603 in FIG. 5 in a state that the hard disk drive 107 has failed will be described.

In this case, if a data read request arrives, in the array controller 205, the management table of the backup memory 216 is referred to and instructions to read out pieces of data of the data concerned are issued to the hard disk drives 106–109. Being in failure, the hard disk drive 107 does not respond to the data read instruction. In the array controller 205, it is judged that the hard disk drive 107 is in failure.

Judging that the hard disk drive 107 is in failure, the array controller 205 refers to the management table of the backup memory 216 and issues, to the hard disk drive 106, an instruction to read out the pieces of data D1, D5, and D6. Similarly, the array controller 205 refers to the management table of the backup memory 216 and issues, to the hard disk drive 108, an instruction to read out the pieces of data D3, P2, and D7. Further, the array controller 205 refers to the management table of the backup memory 216 and issues, to the hard disk drive 109, an instruction to read out the pieces of data P1, D4, and D8. That is, the array controller 205 issues, to the hard disk drives 106, 108, and 109 that are the hard disk drives other than the hard disk drive 107 in failure, the instructions to read out the pieces of data relating to the data for which the read request arrived.

The array controller 205 restores the lost stripe data based on the pieces of data obtained. More specifically, the lost striped data D2 is restored from the striped data D1 and D3 and the parity data P1 and the lost striped data D6 is restored from the striped data D4 and D5 and the parity data P2.

In this manner, the array controller 205 obtains the striped data D1–D9. In the array controller 205, the original recorded data is obtained from the striped data D1–D9.

As described above, even if one hard disk drive 106 fails in the high-speed operation mode, data recorded in the system can be read out.

The cases of reading out data without causing any problems in response to a read access have been described above. However, the above operation may be performed to restore the recorded contents of the hard disk drive 106 when it has failed. In this case, a certain notifying means notifies the manager of the system that the hard disk drive 106 has failed. The manager of the system removes the hard disk drive 106 in failure from the server 201 and mount a new hard disk drive in place of the hard disk drive 106. The lost data are restored in this state, and the restored data are recorded in the newly mounted hard disk drive. In this manner, even if one of the main hard disk drives fails and the data recorded therein can no longer be read out, the original state of the system can be restored.

The transition from the power saving mode to the high-speed operation mode reduces the loads on the hard disk drives 106–108 and allows the hard disk drives 106–108 to fully exercise their capabilities. If the hard disk drives 106–108 have sufficient free space, the movement of surplus data that is performed at step 305 in the flowchart of FIG. 3 may be performed after step 308. As described above, the auxiliary hard disk drive 109 is activated when the loads of handling of surplus data have become heavier than a certain level in the hard disk drives 106–108, whereby the RAID functions can be prevented from being impaired. As a result, the same RAID functions as in the prior art can be obtained while the efficiency of utilization of the hard disk drives is increased and their power consumption is lowered.

Figure 6:
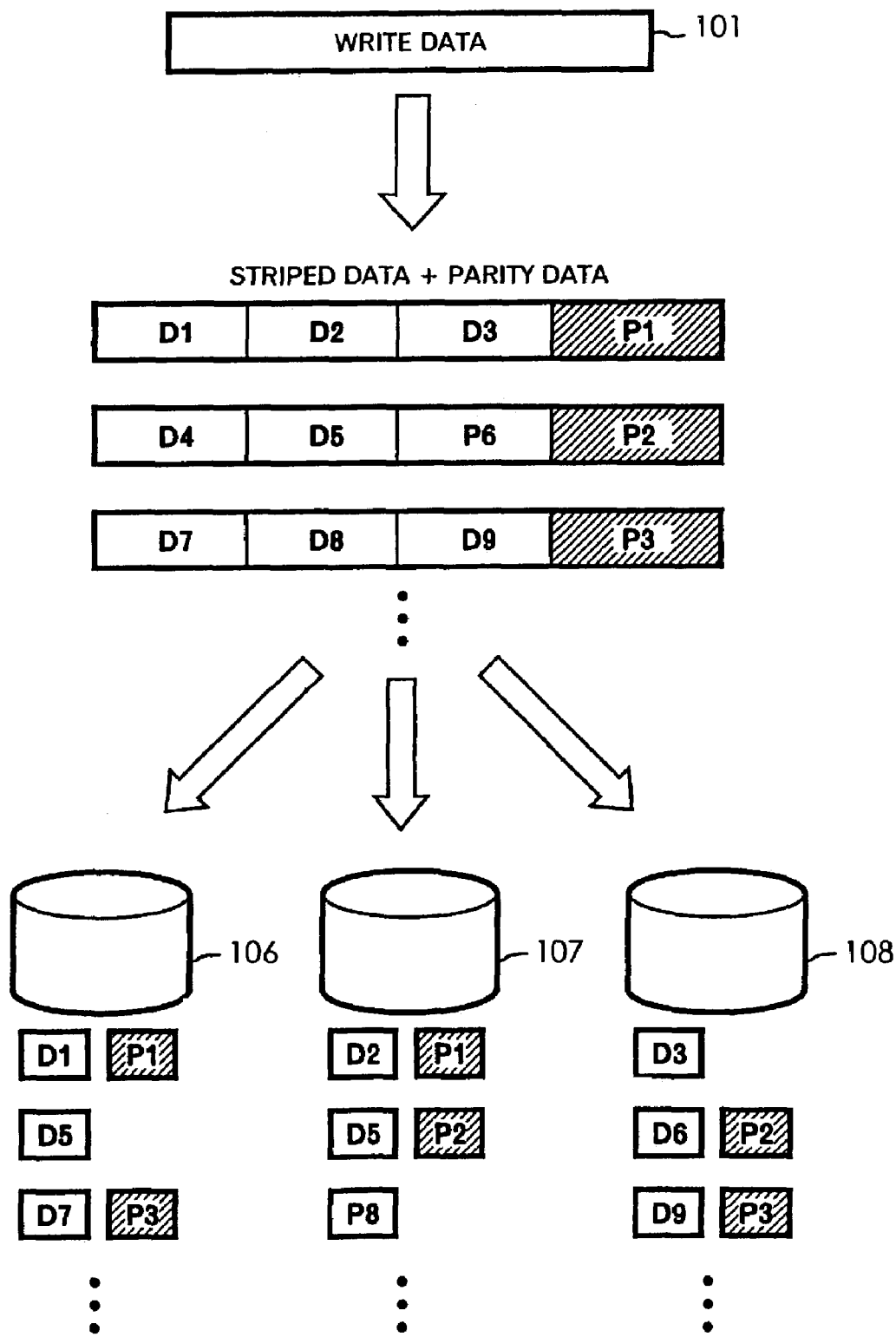
FIGS. 6 and 7 are charts illustrating a second embodiment to which the data processing method according to the invention is applied.
Figure 7:
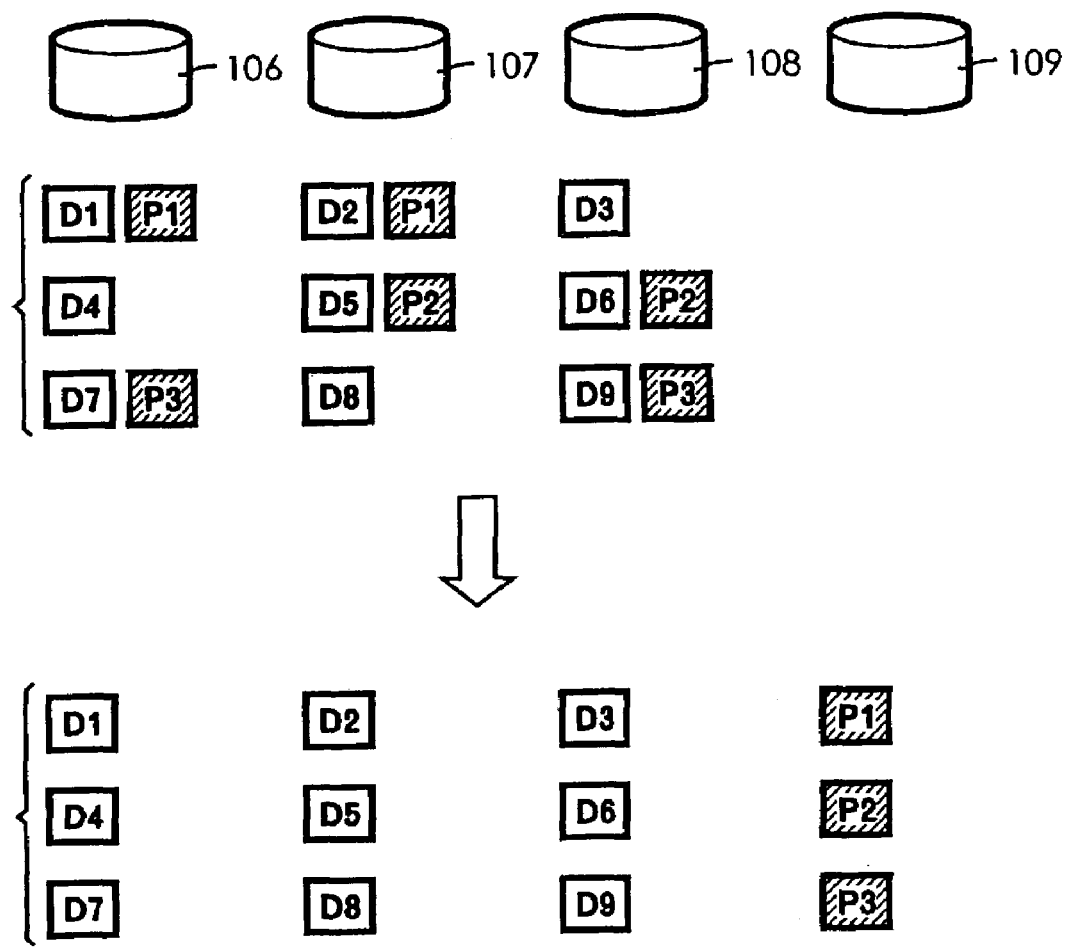

A second embodiment that utilizes the data processing method according to the invention will be described below. FIGS. 6 and 7 are charts illustrating the second embodiment. The second embodiment is directed to a case that parity data are handled as surplus data. A method of the second embodiment can be practiced in the system of FIG. 2, and a flow of processing of the second embodiment is the same as shown in the flowchart of FIG. 3.

First, an operation in the power saving mode will be described. In this example, striped data D1–D9 are generated from write data 101. Further, parity data P1 is generated from the striped data D1–D3, parity data P2 is generated from the striped data D4–D6, and parity data P3 is generated from the striped data D7–D9.

The striped data D1–D9 are assigned to and recorded in the three hard disk drives 106–108 respectively. More specifically, the striped data D1, D4, D7, . . . are recorded in the hard disk drive 106, the striped data D2, D5, D8, . . . are recorded in the hard disk drive 107, and the striped data D3, D6, D9, . . . are recorded in the hard disk drive 108. The parity data P1 is recorded in the hard disk drives 106 and 107, the parity data P2 is recorded in the hard disk drives 107 and 108, and the parity data P3 is recorded in the hard disk drives 106 and 108.

In this example, the parity data are handled as surplus data and recorded in the hard disk drives 106–108 in a distributed manner.

The auxiliary hard disk drive 109 is activated when the loads of handling of surplus data have become heavy in the hard disk drives 106–108 (see FIG. 7). As shown in FIG. 7, the parity data P1–P3 as the surplus data are moved to the auxiliary hard disk drive 109. At this time, the parity data P1–P3 are deleted from the hard disk drives 106–108, whereby the loads of handling of surplus data are reduced in the hard disk drives 106–108.

Alternatively, the RAID functions may be realized by using all the hard disk drives 106–109. In this case, striped data are recorded in the hard disk drives 106–108 and parity data are recorded in the hard disk drive 109 in a state that the auxiliary hard disk drive 109 is in operation, whereby functions equivalent to the functions of RAID3 or RAID4 are realized.

A specific method of generating striped data and parity data (three striped data and their parity data) will be described below. Striped data are represented by $D(1)$, $D(2)$, and $D(3)$, respectively, and parity data is represented by $P(0)$. The data $D(1)$, $D(2)$, $D(3)$, and $P(0)$ satisfy the following Equation (1). The operation symbol "+" means exclusive OR.

$$D(1)+D(2)+D(3)+P(0)=0 \quad (1)$$

Equation (1) is based on the even parity. It is also possible to employ the odd parity, in which case the right side of Equation (1) is changed to "1." Exclusive OR is defined by the following Equations (2) (in the case of binary numbers).

$$0+0=0$$
$$1+0=1$$
$$0+1=1 \quad (2)$$
$$1+1=0$$

According to the definition of exclusive OR, the parity data $P(0)$ is given by the following Equation (3):

$$P(0)=D(1)+D(2)+D(3) \quad (3)$$

If $D(1)=1$, $D(2)=1$, and $D(3)=0$ (binary numbers), $P(0)$ is equal to 0 according to the rules of Equations (2).

Now assume that the striped data $D(1)$ has been lost. $D(1)$ is given by the following Equation (4):

$$D(1)=D(2)+D(3)+P(0) \quad (4)$$

Since $D(2)=1$, $D(3)=0$, and $P(0)=0$, $D(1)$ is determined as "1" according to Equation (4). In this manner, the lost striped data $D(1)$ is restored from the remaining striped data $D(2)$ and $D(3)$ and parity data $P(0)$. Each of the other striped data $D(2)$ and $D(3)$ can be restored from the other striped data and the parity data by a similar calculation. The above calculation is based on the even parity. In the case of odd parity, "+1" should be added to the right sides (or the left sides) of Equations (3) and (4).

According to this embodiment, the RAID functions can be realized by three hard disk drives in contrast to the fact that four hard disk drives are needed in the prior art. As a result, the power consumption can be made lower than in the prior art by an amount corresponding to one hard disk drive and the heat that is generated by idling operations can be reduced. Further, according to this embodiment, the efficiency of utilization of the hard disk drives can be increased. The reduction in performance can be minimized by activating the auxiliary hard disk drive when necessary.

This embodiment employs the power saving mode in which three hard disk drives are used and the high-speed operation mode in which one auxiliary hard disk drive is used additionally. An operation in the power saving mode according to the invention can be realized by using three or more hard disk drives. The number of auxiliary hard disk drives is not limited to one; that is, a plurality of auxiliary hard disk drives can be used.

In this embodiment, the array controller is used as dedicated hardware for realizing RAID. However, the functions of the array controller may be implemented by software. In this case, RAID operations are unified by the host CPU of a server or a proper computer according to software for realizing RAID.

In this embodiment, the management table containing management information of surplus data is provided in the backup memory 216. However, where the invention is implemented by using an array controller having no backup memory or implemented by software without using an array controller, the management table may be provided in a RAM of a computer that controls a server or system. In this case, no special hardware is needed and the cost performance is high. On the other hand, there is a problem that management data is lost at the occurrence of power shutoff due to a power failure or the like during operation of the system.

One method for solving this problem is to back up management data that is recorded in the RAM by recording those in a hard disk drive on a regular basis. In this case, if power shutoff occurs unexpectedly, the first operation to be performed after recovery from the power shutoff is to read out management table that was recorded in the hard disk drive last before the power shutoff. The management table has no management information that was generated after the last backup operation. Therefore, it is unknown in which hard disk drives surplus data of data that were recorded after the last backup are recorded.

In view of the above, each of the hard disk drives that constitute the disk array is scanned. If there exists a data group that is not associated with surplus data, the surplus data is restored and recorded in a place to which it should be written. The management table is updated by adding management information of this surplus data to it. Data in the hard disk drive that do not belong to any data group are unassociated surplus data, and hence they are deleted.

The above operation is performed for all the hard disk drives, whereby surplus data and management information are restored. This process completes in a shorter time when the amount of management information that was updated after the management table was backed up last to the hard disk drive is smaller. Therefore, this process completes in a shorter time by backing up the management table to the hard disk drive more frequently.

The embodiments of the invention have been described above in a specific manner. However, the invention is not limited to the embodiments and various modifications are possible without departing from the spirit and scope of the invention.

Figure 8:
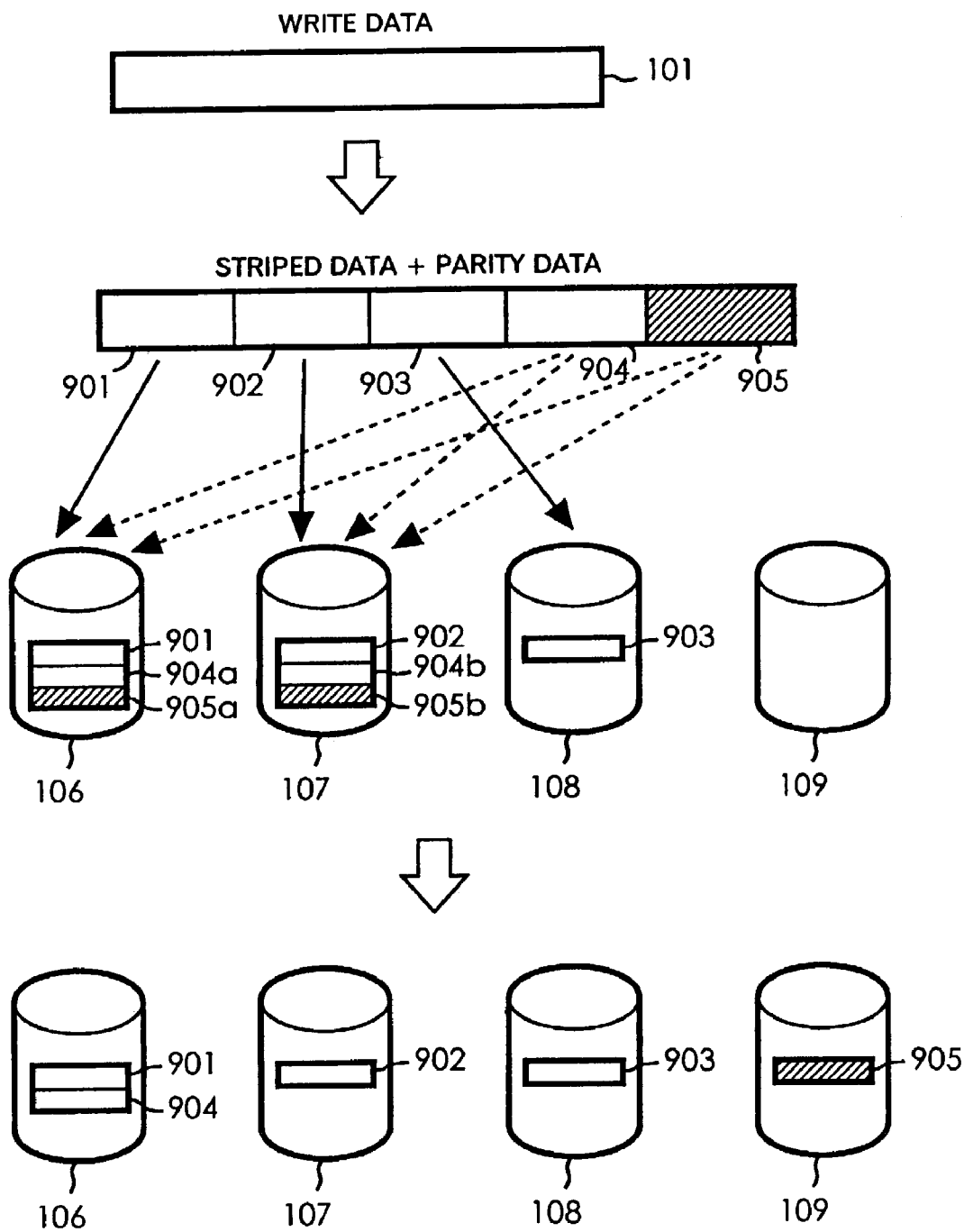
FIG. 8 is a chart illustrating a modification to which the data processing method according to the invention is applied.

FIG. 8 is a chart illustrating a modification to which the data processing method according to the invention is applied. FIG. 8 shows a case that N striped data and their parity data are recorded in N–1 hard disk drives in a distributed manner. More specifically, FIG. 8 shows a system that uses three hard disk drives as main recording devices and one auxiliary hard disk drive as an auxiliary recording device.

In this example, four striped data 901–904 are generated from data 101 to be recorded in the system and parity data 905 is generated from the striped data 901–904. That is, five data are generated in total. Three of the five data are recorded in respective hard disk drives 106, 107, and 108 as main recording devices. The remaining surplus data, that is, the striped data 904 and the parity data 905 are recorded in the hard disk drives 106 and 107 respectively. At this time, the same surplus data are recorded redundantly in the hard disk drives 106 and 107 respectively. Management information of the surplus data is recorded in a backup memory that is provided in an array controller (not shown).

FIG. 8 shows that the striped data 901 is recorded in the hard disk drive 106, the striped data 902 is recorded in the hard disk drive 107, the striped data 903 is recorded in the hard disk drive 108, the striped data 904 is recorded in both of the hard disk drives 106 and 107 as respective striped data 904*a* and 904*b,* and the parity data 905 is recorded in both of the hard disk drives 106 and 107 as respective parity data 905*a* and 905*b*. The data 904*a* and 904*b* are identical to the data 904, and the data 905*a* and 905*b* are identical to the data 905.

Now assume that the hard disk drive 106 has failed and the striped data 901 and 904*a* and the parity data 905*a* have been lost. In this case, the striped data 901 is restored from the striped data 902, 903, and 904*b* and the parity data 905*b*. The loss of the striped data 904*a* and the parity data 905*a* causes no problems because the same data are recorded in the hard disk drive 107. If the hard disk drive 107 or 108 fails and the data recorded therein are lost, the lost data are restored in a similar manner and hence the system loses no data.

In the example of FIG. 8, the loads on the hard disk drives that are caused by handling of surplus data are heavier than in the example of FIG. 1. In the example of FIG. 8, to decrease the loads on the hard disk drives 106 and 107 that are caused by the presence of surplus data, the hard disk drive 109 as the auxiliary recording device is activated with proper timing and the surplus data 905 is moved to it. The surplus data 904*a* is left in the hard disk drive 106 as surplus data 904. FIG. 8 shows that the surplus data 905 is moved to the hard disk drive 109 and the surplus data 904*b,* 905*a,* and 905*b* are deleted. As a result, the loads on the hard disk drives 106 and 107 that are caused by handling of surplus data can be reduced. The surplus data 905 that is recorded in the hard disk drive 109 may be either the surplus data 905*a* or the surplus data 905*b*.

According to the example of FIG. 8, a RAID system can be formed by three hard disk drives in contrast to the fact that five hard disk drives are needed in the prior art. Also in the example of FIG. 8, selection can be made between the power saving mode in which the hard disk drives 106–108 operate and the high-speed operation mode in which the hard disk drives 106–109 operate.

Figure 9:
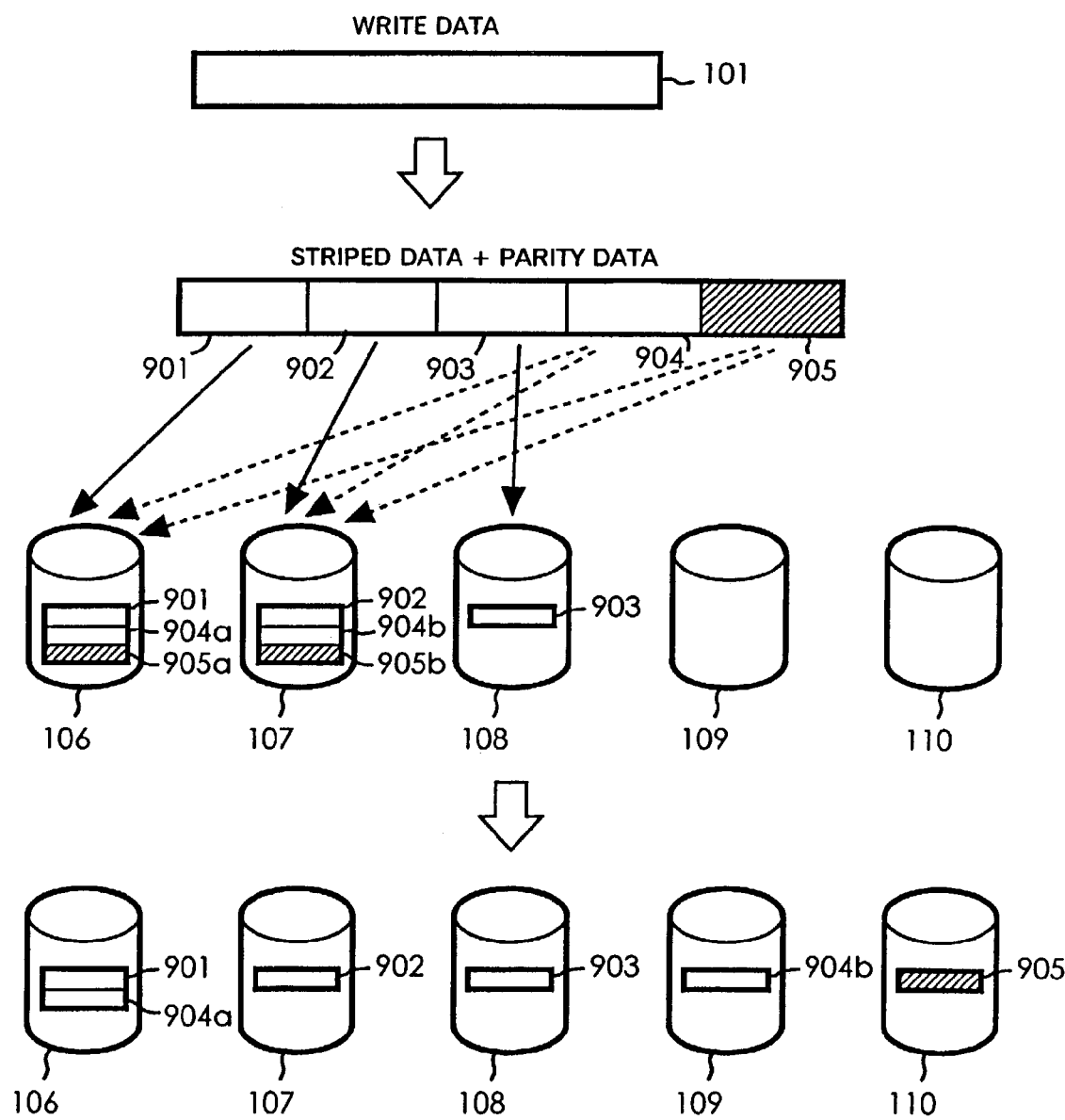
FIG. 9 is a chart illustrating another modification to which the data processing method according to the invention is applied.

FIG. 9 illustrates another modification. In the example of FIG. 9, two hard disk drives 109 and 110 are prepared as auxiliary hard disk drives. The hard disk drives 109 and 110 are activated with proper timing and surplus data 904*b* and surplus data 905 are moved to the respective hard disk drives 109 and 110. At this time, surplus data 905*a* is deleted from a hard disk drive 106 and surplus data 904*b* and 905*b* are deleted from a hard disk drive 107. In this manner, the loads on the hard disk drives 106 and 107 are reduced. The surplus data 905 that is recorded in the hard disk drive 110 may be either the surplus data 905*a* or the surplus data 905*b*.

The invention may be applied to a NAS (network attached storage). The invention may also be applied to a system using magnetic tapes as recording media. For example, the invention can be applied to a system using a lot of magnetic tapes in the form of an array.

The typical aspect of the invention that is disclosed in this specification provides the following advantages. A recording system can be provided in which the efficiency of utilization of recording devices is increased. A technique can be provided that reduces the power consumption in a system using RAID with least deterioration of RAID functions.

What is claimed is:

1. A data processing method for storing a plurality of segmented data and corresponding parity data using a plurality of electronic storage devices, the method comprising:
   designating a first set of data, from a combination of the parity data and the plurality of segmented data, as surplus data directed for storage in an auxiliary electronic storage device, wherein the auxiliary electronic storage device is unavailable in a power saving mode, and designating the remaining data as primary data;
   storing the primary data in the plurality of main electronic storage devices in a distributed manner; and
   storing a first copy of the surplus data on a first main electronic storage device and storing a second copy of the surplus data on a second main electronic storage device.

2. The method of claim 1, further comprising activating the auxiliary electronic storage device and storing the surplus data on the auxiliary storage device from the first or second copy of the surplus data.

3. The method of claim 2, further comprising implementing the power saving mode after storing the surplus data on the auxiliary electronic storage device.

4. The method of claim 1, further comprising generating the surplus data using the primary data.

5. The method of claim 1, further comprising generating one of the plurality of segmented data stored on one of the main electronic storage devices using the remaining plurality of segmented data and the parity data.

6. The method of claim 1, further comprising generating the parity data from the plurality of segmented data.

7. A data processing method for storing a plurality of segmented data and corresponding parity data using a plurality of electronic storage devices, the method comprising:
   generating the parity data from the plurality of segmented data;
   designating a first set of data, from a combination of the parity data and the plurality of segmented data, as surplus data directed for storage in an auxiliary electronic storage device, wherein the auxiliary electronic storage device is unavailable in a power saving mode, and designating the remaining data as primary data;

storing the primary data in the plurality of main electronic storage devices in a distributed manner;

storing a first copy of the surplus data on a first main electronic storage device and storing a second copy of the surplus data on a second main electronic storage device;

activating the auxiliary electronic storage device and storing the surplus data on the auxiliary storage device from the first or second copy of the surplus data; and implementing the power saving mode after storing the surplus data on the auxiliary electronic storage device.

8. The method of claim 7, further comprising generating the surplus data using the primary data.

9. The method of claim 7, further comprising generating one of the plurality of segmented data stored on one of the main electronic storage devices using the remaining plurality of segmented data and the parity data.

10. A data processing apparatus for storing a plurality of segmented data and corresponding parity data using a plurality of electronic storage devices, the apparatus comprising:

a designation module configured to designate a first set of data, from a combination of the parity data and the plurality of segmented data, as surplus data directed for storage in an auxiliary electronic storage device, wherein the auxiliary electronic storage device is unavailable in a power saving mode, and designate the remaining data as primary data;

a storage module configured to store the primary data in the plurality of main electronic storage devices in a distributed manner; and the storage module further configured to store a first copy of the surplus data on a first main electronic storage device and store a second copy of the surplus data on a second main electronic storage device.

11. The apparatus of claim 10, further comprising an auxiliary storage module configured to activate the auxiliary electronic storage device and store the surplus data on the auxiliary storage device from the first or second copy of the surplus data.

12. The apparatus of claim 11, further comprising a power saving module configured to implement the power saving mode after storing the surplus data on the auxiliary electronic storage device.

13. The apparatus of claim 10, further comprising a data generation module configured to generate the surplus data using the primary data.

14. The apparatus of claim 10, further comprising a data generation module configured to generate one of the plurality of segmented data stored on one of the main electronic storage devices using the remaining plurality of segmented data and the parity data.

15. The apparatus of claim 10, further comprising a data generation module configured to generate the parity data from the plurality of segmented data.

16. A data processing apparatus for storing a plurality of segmented data and corresponding parity data using a plurality of electronic storage devices, the apparatus comprising:

a data generation module configured to generate the parity data from the plurality of segmented data;

a designation module configured to designate a first set of data, from a combination of the parity data and the plurality of segmented data, as surplus data directed for storage in an auxiliary electronic storage device, wherein the auxiliary electronic storage device is unavailable in a power saving mode, and designate the remaining data as primary data;

a storage module configured to store the primary data in the plurality of main electronic storage devices in a distributed manner;

the storage module further configured to store a first copy of the surplus data on a first main electronic storage device and store a second copy of the surplus data on a second main electronic storage device;

an auxiliary storage module configured to activate the auxiliary electronic storage device and store the surplus data on the auxiliary storage device from the first or second copy of the surplus data; and a power saving module configured to implement the power saving mode after storing the surplus data on the auxiliary electronic storage device.

17. The apparatus of claim 8, further comprising a data generation module configured to generate the surplus data using the primary data.

18. The apparatus of claim 8, further comprising a data generation module configured to generate one of the plurality of segmented data stored on one of the main electronic storage devices using the remaining plurality of segmented data and the parity data.

19. A data processing system for storing a plurality of segmented data and corresponding parity data using a plurality of electronic storage devices, the data processing system comprising:

a host server;

a storage system controller;

a plurality of electronic storage devices;

a plurality of segmented data;

a set of parity data corresponding to the plurality of segmented data;

a designation module configured to designate a first set of data, from a combination of the parity data and the plurality of segmented data, as surplus data directed for storage in an auxiliary electronic storage device, wherein the auxiliary electronic storage device is unavailable in a power saving mode, and designate the remaining data as primary data;

a storage module configured to store the primary data in the plurality of main electronic storage devices in a distributed manner;

the storage module further configured to store a first copy of the surplus data on a first main electronic storage device and store a second copy of the surplus data on a second main electronic storage device;

an auxiliary storage module configured to activate the auxiliary electronic storage device and store the surplus data on the auxiliary storage device from the first or second copy of the surplus data; and a power saving module configured to implement the power saving mode after storing the surplus data on the auxiliary electronic storage device.

20. A computer readable storage medium comprising computer readable code configured to carry out a process for storing a plurality of segmented data and corresponding parity data using a plurality of electronic storage devices, the process comprising:

generating the parity data from the plurality of segmented data;

designating a first set of data, from a combination of the parity data and the plurality of segmented data, as surplus data directed for storage in an auxiliary electronic storage device, wherein the auxiliary electronic storage device is unavailable in a power saving mode, and designating the remaining data as primary data;

storing the primary data in the plurality of main electronic storage devices in a distributed manner;

storing a first copy of the surplus data on a first main electronic storage device and storing a second copy of the surplus data on a second main electronic storage device;

activating the auxiliary electronic storage device and storing the surplus data on the auxiliary storage device from the first or second copy of the surplus data;

erasing the first copy of the surplus data from the first main electronic storage device and the second copy of the surplus data from the second main electronic storage device; and implementing the power saving mode after storing the surplus data on the auxiliary electronic storage device.

21. The computer readable storage medium of claim 20, wherein the process further comprises generating the surplus data using the primary data.

22. The computer readable storage medium of claim 21, wherein the process further comprises generating one of the plurality of segmented data stored on one of the main electronic storage devices using the remaining plurality of segmented data and the parity data.

23. A data processing apparatus for storing a plurality of segmented data and corresponding parity data using a plurality of electronic storage devices, the apparatus comprising:

means for generating the parity data from the plurality of segmented data;

means for designating a first set of data, from a combination of the parity data and the plurality of segmented data, as surplus data directed for storage in an auxiliary electronic storage device, wherein the auxiliary electronic storage device is unavailable in a power saving mode, and designating the remaining data as primary data;

means for storing the primary data in the plurality of main electronic storage devices in a distributed manner;

means for temporarily storing a first copy of the surplus data on a first main electronic storage device and temporarily storing a second copy of the surplus data on a second main electronic storage device;

means for activating the auxiliary electronic storage device and storing the surplus data on the auxiliary storage device from the first or second copy of the surplus data;

means for erasing the first copy of the surplus data from the first main electronic storage device and the second copy of the surplus data from the second main electronic storage device; and means for implementing the power saving mode after storing the surplus data on the auxiliary electronic storage device.

* * * * *